United States Patent
Tsai et al.

(10) Patent No.: US 7,699,490 B2
(45) Date of Patent: Apr. 20, 2010

(54) LIGHT-EMITTING STRUCTURE FOR GENERATING AN ANNULAR ILLUMINATION EFFECT

(75) Inventors: Chien-Hung Tsai, Jhonghe (TW); Yao-I Wang, Jhonghe (TW); Pei-Hung Meng, Jhonghe (TW); Wei-Jen Hsu, Banciao (TW)

(73) Assignees: Ledtech Electronics Corp., Taipei County (TW); Energyled Corporation, Taipei County (TW)

( * ) Notice: Subject to any disclaimer, the term of this patent is extended or adjusted under 35 U.S.C. 154(b) by 0 days.

(21) Appl. No.: 12/292,877

(22) Filed: Nov. 28, 2008

(65) Prior Publication Data

US 2010/0002425 A1    Jan. 7, 2010

(30) Foreign Application Priority Data

Jul. 2, 2008    (TW) ............................... 97124881 A

(51) Int. Cl.
*F21V 33/00*    (2006.01)

(52) U.S. Cl. .................. 362/154; 362/101; 362/217.05; 362/245; 362/249

(58) Field of Classification Search .................. 362/101, 362/154, 217.02, 217.05, 223, 225, 227, 362/244, 245, 249.01, 249.02, 253, 304, 362/305, 326–329, 334, 356, 551, 555, 558, 362/562, 800, 806, 810; 40/541, 542, 544, 40/545, 546, 547, 558, 559, 560, 582
See application file for complete search history.

(56) References Cited

U.S. PATENT DOCUMENTS

| | | | | |
|---|---|---|---|---|
| 6,092,905 A | * | 7/2000 | Koehn | 362/101 |
| 6,685,335 B1 | * | 2/2004 | Yeh et al. | 362/184 |
| 6,712,494 B1 | * | 3/2004 | Hodge | 362/565 |
| 6,923,549 B2 | * | 8/2005 | Hoy | 362/101 |
| 7,040,776 B2 | * | 5/2006 | Harrell et al. | 362/154 |
| 2003/0090892 A1 | * | 5/2003 | Su | 362/101 |
| 2007/0091633 A1 | * | 4/2007 | Harrity et al. | 362/551 |
| 2008/0049168 A1 | * | 2/2008 | Kubota | 349/65 |

* cited by examiner

*Primary Examiner*—Hargobind S Sawhney
(74) *Attorney, Agent, or Firm*—Rosenberg, Klein & Lee

(57) ABSTRACT

A light-emitting structure for generating an annular illumination effect includes a light-guiding module, a cover module, and a first light-emitting module. The light-guiding module has a hollow light-guiding body and a reflecting layer formed on an inner surface of the hollow light-guiding body. The cover module has a first cover body disposed on one end side of the hollow light-guiding body and a second cover body disposed on the other opposite end side of the hollow light-guiding body. The first light-emitting module has a plurality of first light-emitting elements disposed between the hollow light-guiding body and the first cover body. Therefore, first light beams generated by the first light-emitting elements are projected onto the hollow light-guiding body, and the first light beams are guided by the hollow light-guiding body and are reflected by the reflecting layer in order to make the hollow light-guiding body generate the annular illumination effect.

19 Claims, 13 Drawing Sheets

LIGHT-EMITTING STRUCTURE FOR GENERATING AN ANNULAR ILLUMINATION EFFECT

BACKGROUND OF THE INVENTION

1. Field of the Invention

The present invention relates to a light-emitting structure, and particularly relates to a light-emitting structure for generating an annular illumination effect.

2. Description of Related Art

The invention of the lamp greatly changed the style of building construction and the living style of human beings, allowing people to work during the night. Without the invention of the lamp, we may stay in the living conditions of ancient civilizations.

Various lamps such as incandescent bulbs, fluorescent bulbs, power-saving bulbs and etc. have been intensively used for indoor illumination. These lamps commonly have the disadvantages of quick attenuation, high power consumption, high heat generation, short working life, high fragility, and being not recyclable. Further, the rapid flow of electrons (about 120 per second) through the electrodes of a regular fluorescent bulb causes an unstable current at the onset of lighting a fluorescent bulb, resulting in a flash of light that is harmful to the sight of the eyes. In order to eliminate this problem, a high frequency electronic ballast may be used. When a fluorescent or power-saving bulb is used with high frequency electronic ballast, it saves about 20% of the consumption of power and eliminates the problem of flashing. However, the high frequency electronic ballast is not detachable when installed in a fluorescent or power-saving bulb, the whole lamp assembly becomes useless if the bulb is damaged. Furthermore, because a fluorescent bulb contains a mercury coating, it may cause pollution to the environment when thrown away after damage.

Therefore, it is desirable to provide a lamp that eliminates the aforesaid problems.

SUMMARY OF THE INVENTION

One particular aspect of the present invention is to provide a light-emitting structure for generating an annular illumination effect. The light-emitting structure generates the annular illumination effect by matching a hollow light-guiding body, at least one light-emitting module and two cover bodies.

In order to achieve the above-mentioned aspects, the present invention provides a light-emitting structure for generating an annular illumination effect, including: a light-guiding module, a cover module, and a first light-emitting module. The light-guiding module has a hollow light-guiding body and a reflecting layer formed on an inner surface of the hollow light-guiding body. The cover module has a first cover body disposed on one end side of the hollow light-guiding body and a second cover body disposed on the other opposite end side of the hollow light-guiding body. The first light-emitting module has a plurality of first light-emitting elements disposed between the hollow light-guiding body and the first cover body.

Therefore, first light beams generated by the first light-emitting elements are projected onto the hollow light-guiding body, and the first light beams are guided by the hollow light-guiding body and are reflected by the reflecting layer in order to make the hollow light-guiding body generate the annular illumination effect.

Hence, the advantage of the present invention is that: the light-emitting structure generates the annular illumination effect by matching a hollow light-guiding body, at least one light-emitting module and two cover bodies.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED EMBODIMENTS

Figure 1A:
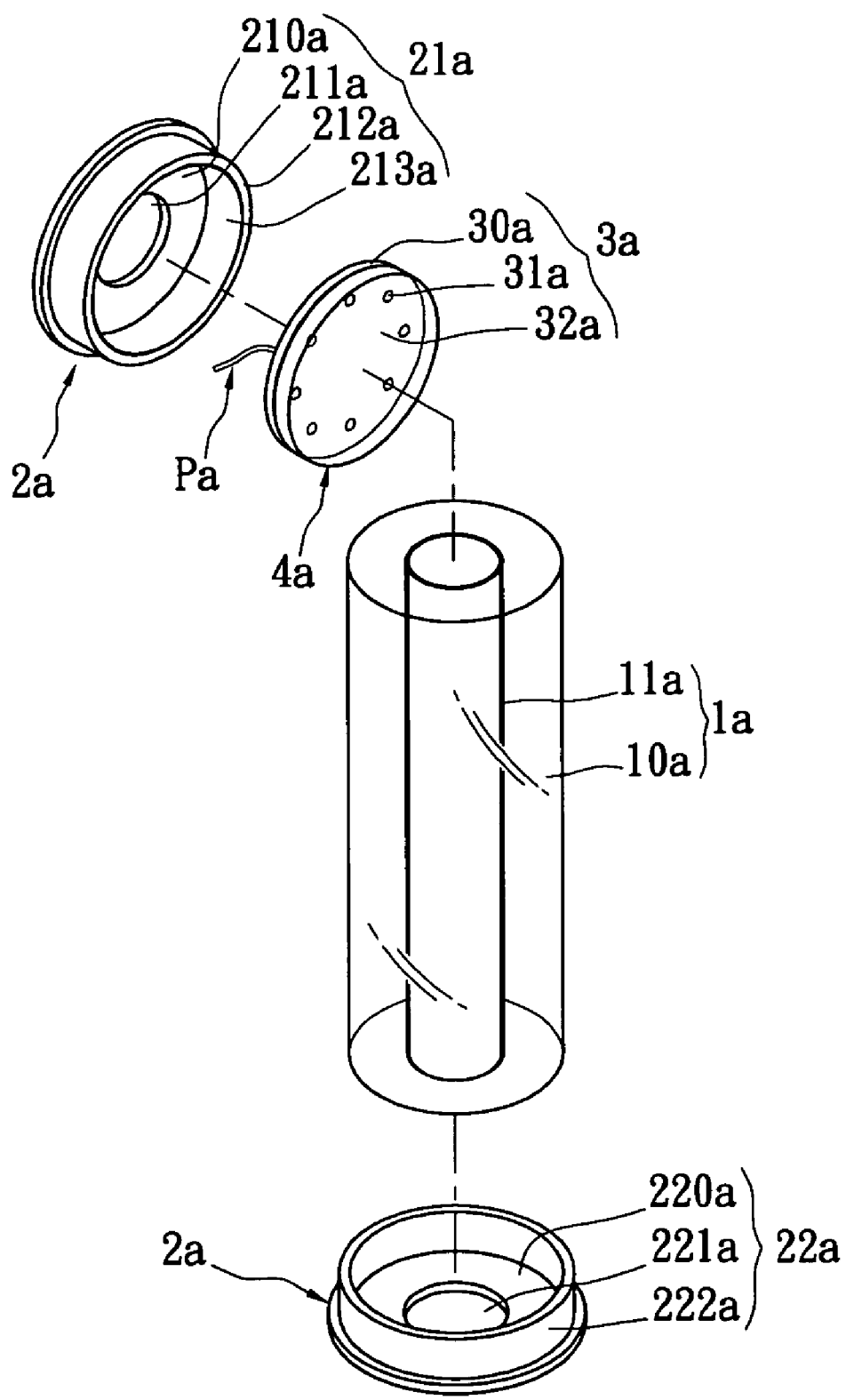
FIG. 1A is a perspective, exploded view of a light-emitting structure for generating an annular illumination effect according to the first embodiment of the present invention.
Figure 1B:
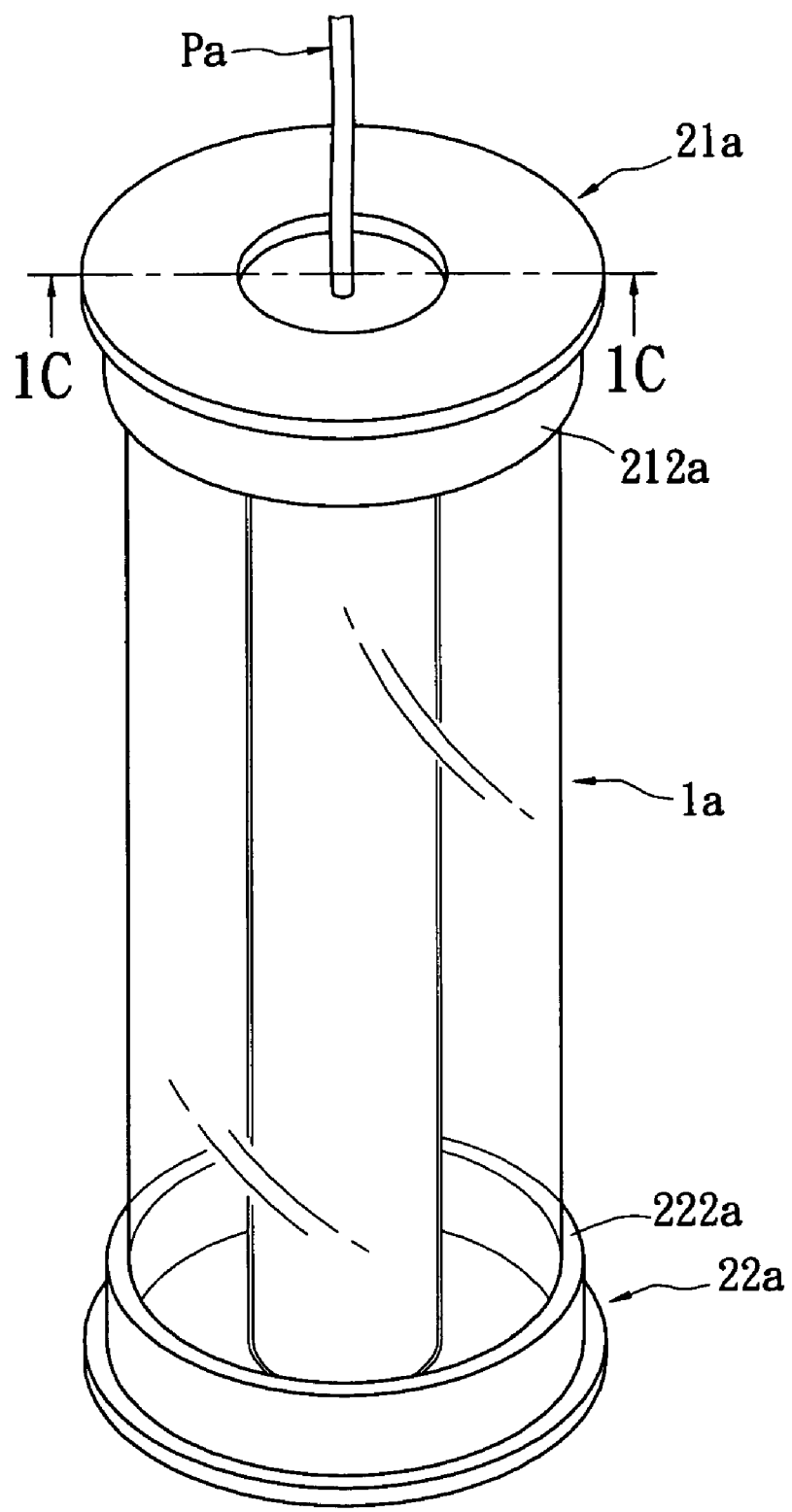
FIG. 1B is a perspective, exploded view of a light-emitting structure for generating an annular illumination effect according to the first embodiment of the present invention.
Figure 1C:
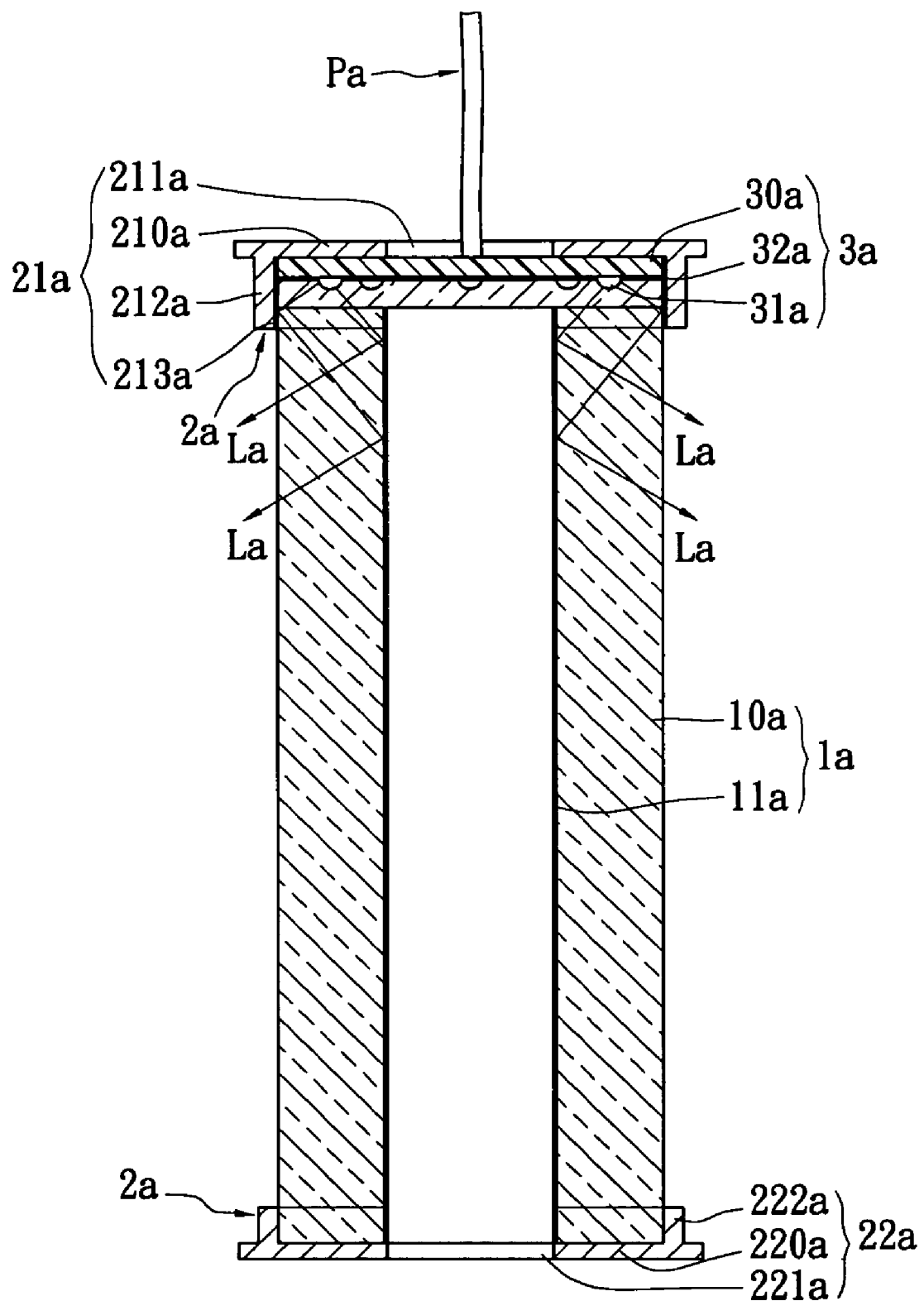
FIG. 1C is a cross-sectional view along line 1C-1C of FIG. 2.

Referring to FIGS. 1A to 1C, the first embodiment of the present invention provides a light-emitting structure for generating an annular illumination effect, including: a light-guiding module 1a, a cover module 2a, a first light-emitting module 3a, and a transparent package colloid 4a.

The light-guiding module 1a has a hollow light-guiding body 10a and a reflecting layer 11a formed on an inner surface of the hollow light-guiding body 10a. Both the hollow light-guiding body 10a and the reflecting layer 11a can be formed by double injection molding, coating or spraying. The hollow light-guiding body 10a can be a hollow column of any shape, such as a circular column, a square column, a rectangular column, or a polygonal column etc. The hole of the hollow light-guiding body 10a can also be of any shape, such as circular, square, rectangular, polygonal etc. In the first embodiment, the hollow light-guiding body 10a is a hollow circular column, and the hollow shape of the hollow light-guiding body 10a is circular shape.

Moreover, the cover module 2a has a first cover body 21a disposed on one end side of the hollow light-guiding body 10a and a second cover body 22a disposed on the other opposite end side of the hollow light-guiding body 10a. In addition, both the first cover body 21a and the second cover body 22a are made of opaque material.

The first cover body 21a has a first plane portion 210a, a first opening 211a passing through the first plane portion 210a, a first annular portion 212a disposed on the first plane portion 210a and a first reflected portion 213a formed on an inner surface of the first annular portion 212a. In addition, one end side of the hollow light-guiding body 10a is enclosed by the first annular portion 212a in order to fix the first cover body 21a on one end side of the hollow light-guiding body 10a as shown in FIGS. 1B and 1C.

The second cover body 22a has a second plane portion 220a, a second opening 221a passing through the second plane portion 220a and a second annular portion 222a disposed on the second plane portion 220a. In addition, the other opposite end side of the hollow light-guiding body 10a is enclosed by the second annular portion 222a in order to fix the second cover body 22a on the other opposite end side of the hollow light-guiding body 10a.

Furthermore, the first light-emitting module 3a has a first substrate 30a, a plurality of first light-emitting elements 31a and a first reflecting layer 32a. The first substrate 30a can be a PCB (Printed Circuit Board). The PCB is connected to an electric wire Pa, and the electric wire Pa passes through the first opening 211a and electrically connects to a power source; Alternatively, the PCB has a function for transforming solar energy into electric energy in order to supply power for the first light-emitting elements 31a. The first light-emitting elements 31a are electrically disposed on the first substrate 30a. The first reflecting layer 32a is formed on the first substrate 30a and between the first light-emitting elements 31a. Moreover, the first light-emitting elements 31a not only can be point light source, but also can be an annular light source. For example, the first light-emitting elements 31a can be covered by an annular phosphor layer (not shown) firstly, and then the first light-emitting elements 31a mating with the annular phosphor layer can show the annular light source. In addition, the color of the hollow light-guiding body 10a and the color of the light source generated by the first light-emitting elements 31a can be changed according to different requirements.

Referring to FIG. 1C, the first light-emitting module 3a is received in the first cover body 21a, so the first light-emitting elements 31a are disposed over the first plane portion 210a and are enclosed by the first annular portion 212a, and the first light-emitting elements 31a are disposed between the hollow light-guiding body 10a and the first cover body 21a. In addition, the light beams generated by the first light-emitting elements 31a are effectively reflected onto the hollow light-guiding body 10a by matching the first reflected portion 213a and the first reflecting layer 32a.

The transparent package colloid 4a is filled between one end side of the hollow light-guiding body 10a and the first light-emitting elements 31a. Hence, there is no air between one end side of the hollow light-guiding body 10a and the first light-emitting elements 31a. Therefore, the transparent package colloid 4a is helpful to the prevent invention to reduce optical loss from the first light-emitting elements 31a to the hollow light-guiding body 10a.

Hence, first light beams La generated by the first light-emitting elements 31a are projected onto the hollow light-guiding body 10a (the hollow light-guiding body 10a is made of transparent materials), and the first light beams La are guided by the hollow light-guiding body 10a and are reflected by the reflecting layer 11a in order to make the hollow light-guiding body 10a generate the annular illumination effect.

Figure 2A:
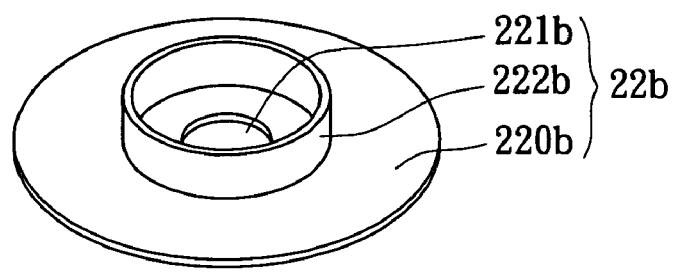
FIG. 2A is a perspective, schematic view of a second cover body of a light-emitting structure for generating an annular illumination effect according to the second embodiment of the present invention.
Figure 2B:
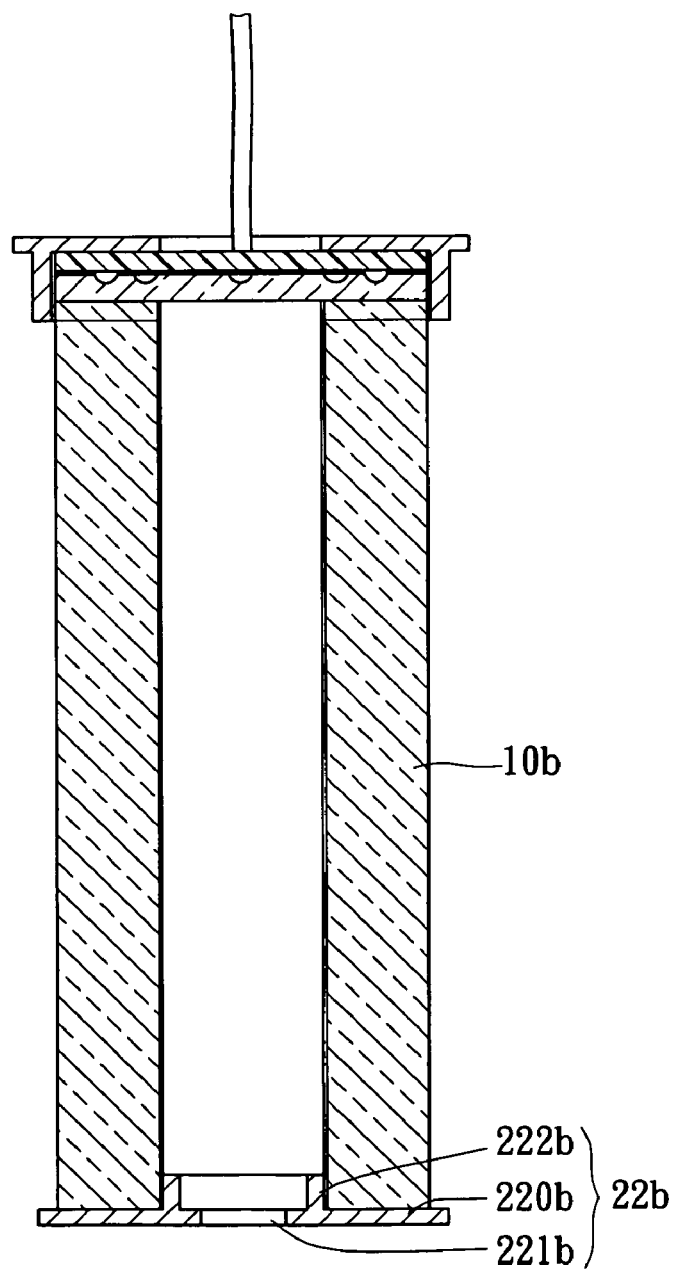
FIG. 2B is a lateral, cross-sectional view of a light-emitting structure for generating an annular illumination effect according to the second embodiment of the present invention.

Referring to FIGS. 2A and 2B, the difference between the second embodiment and the first embodiment is that: in the second embodiment, the second cover body 22b has a second plane portion 220b, a second opening 221b passing through the second plane portion 220b and a second annular portion 222b disposed on the second plane portion 220b. The second annular portion 222b is retained in the other opposite end side of the hollow light-guiding body 10b in order to fix the second cover body 22b on the other opposite end side of the hollow light-guiding body 10b as shown in FIG. 2B.

Figure 3A:
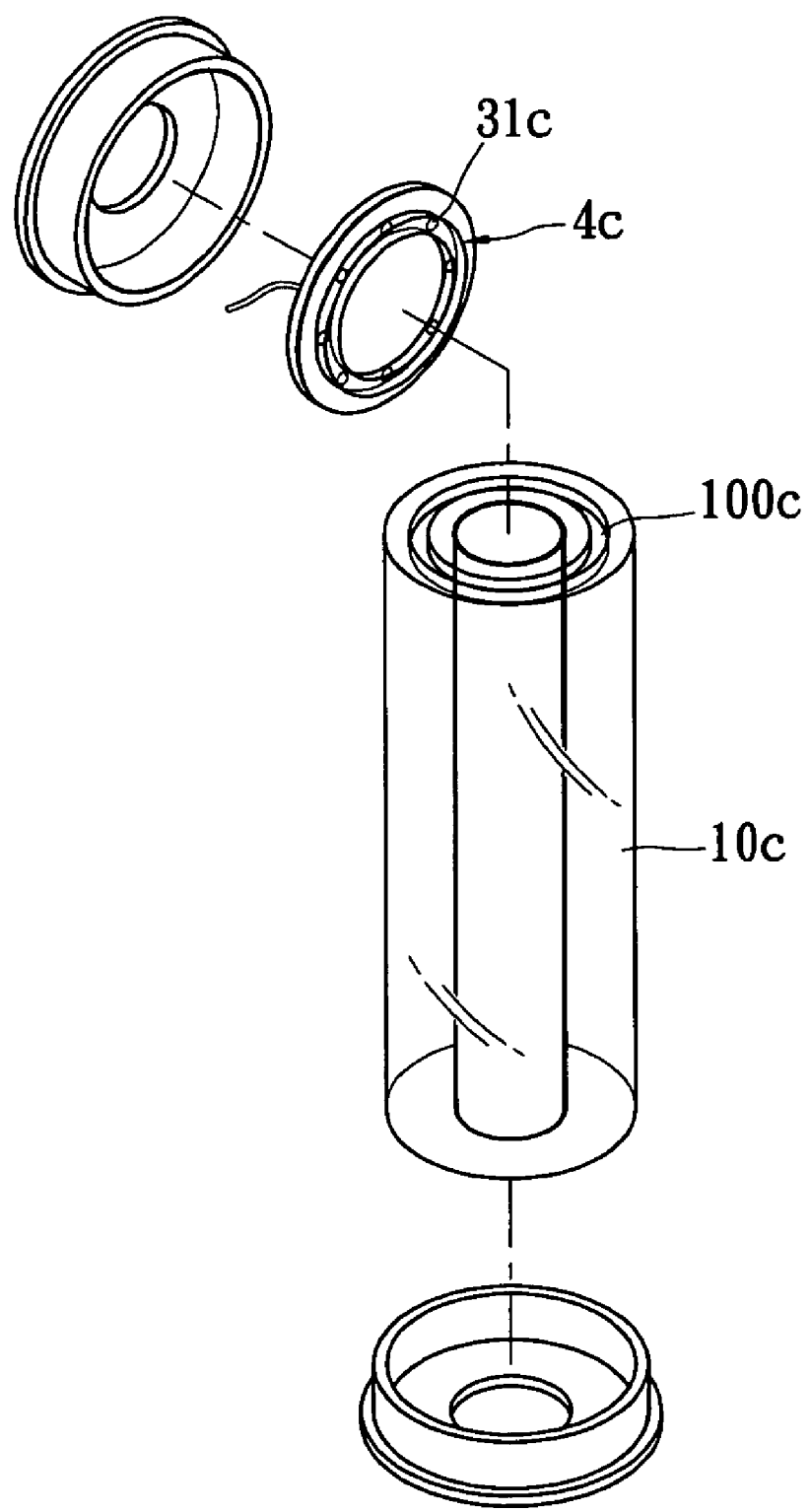
FIG. 3A is a perspective, exploded view of a light-emitting structure for generating an annular illumination effect according to the third embodiment of the present invention.
Figure 3B:
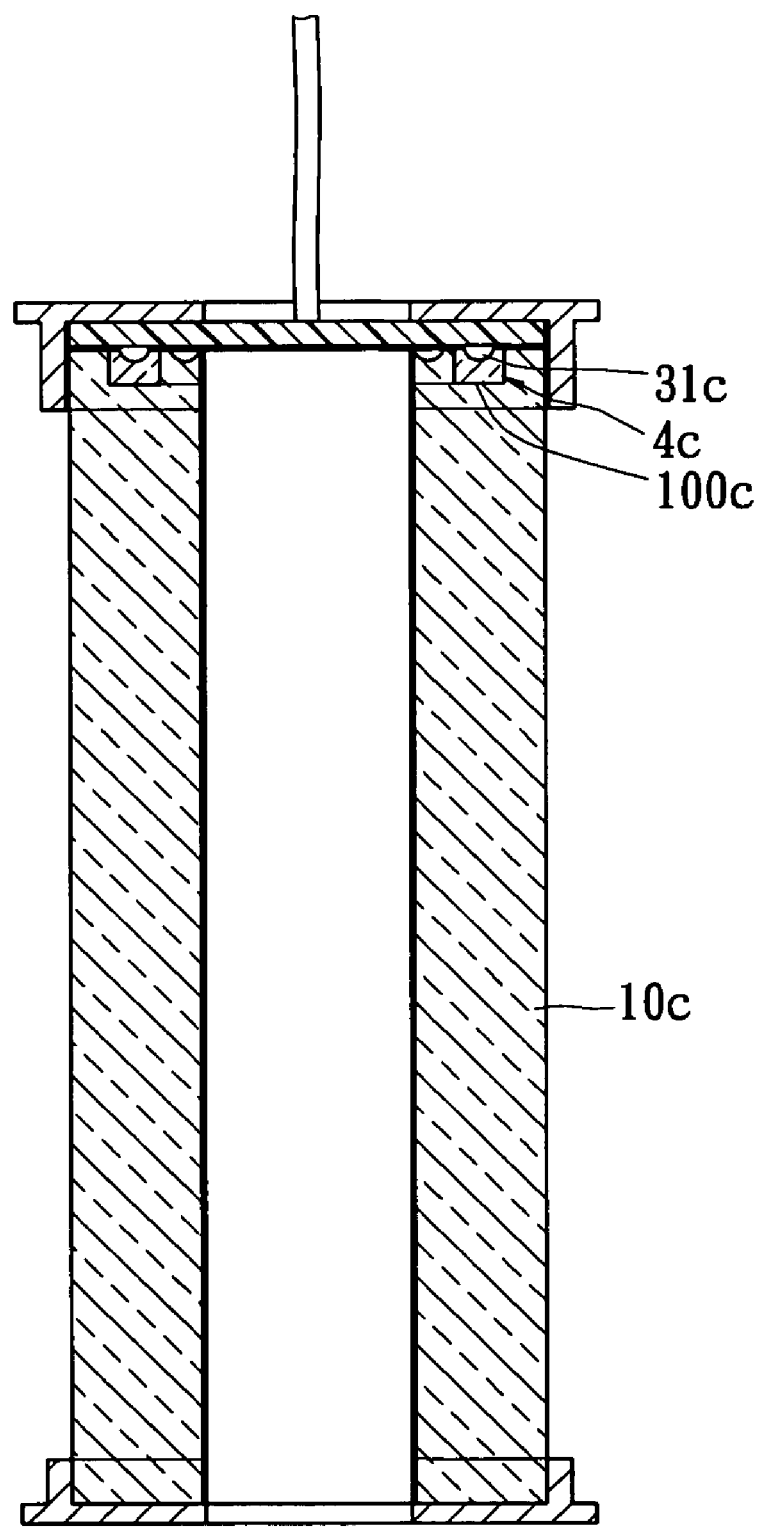
FIG. 3B is a lateral, cross-sectional view of a light-emitting structure for generating an annular illumination effect according to the third embodiment of the present invention.

Referring to FIGS. 3A and 3B, the difference between the third embodiment and the first embodiment is that: in the third embodiment, the hollow light-guiding body 10c has an annular groove 100c formed on its one end side, and the first light-emitting elements 31c are received in the annular groove 10c. Because the annular groove 10c has an annular shape, the transparent package colloid 4c filled between the first light-emitting elements 31c and the annular groove 100c has an annular shape.

Figure 4:
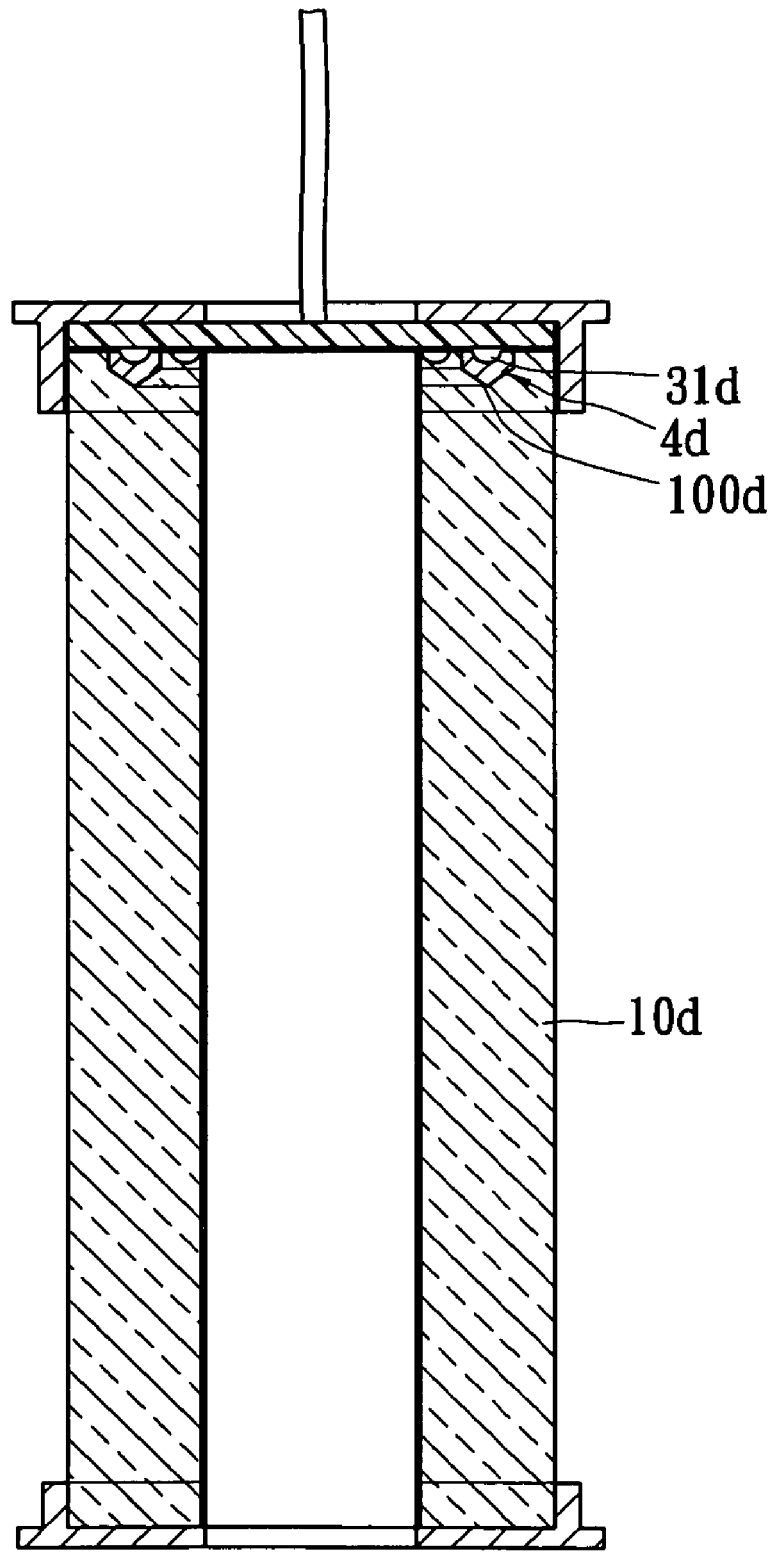
FIG. 4 is a lateral, cross-sectional view of a light-emitting structure for generating an annular illumination effect according to the fourth embodiment of the present invention.

Referring to FIG. 4, the difference between the fourth embodiment and the third embodiment is that: in the fourth embodiment, the hollow light-guiding body 10d has an annular groove 100d with V shape formed on its one end side, and the first light-emitting elements 31d are received in the annular groove 100d. Because the annular groove 100d has a V shape, the transparent package colloid 4d filled between the first light-emitting elements 31d and the annular groove 100d has a V shape.

Figure 5:
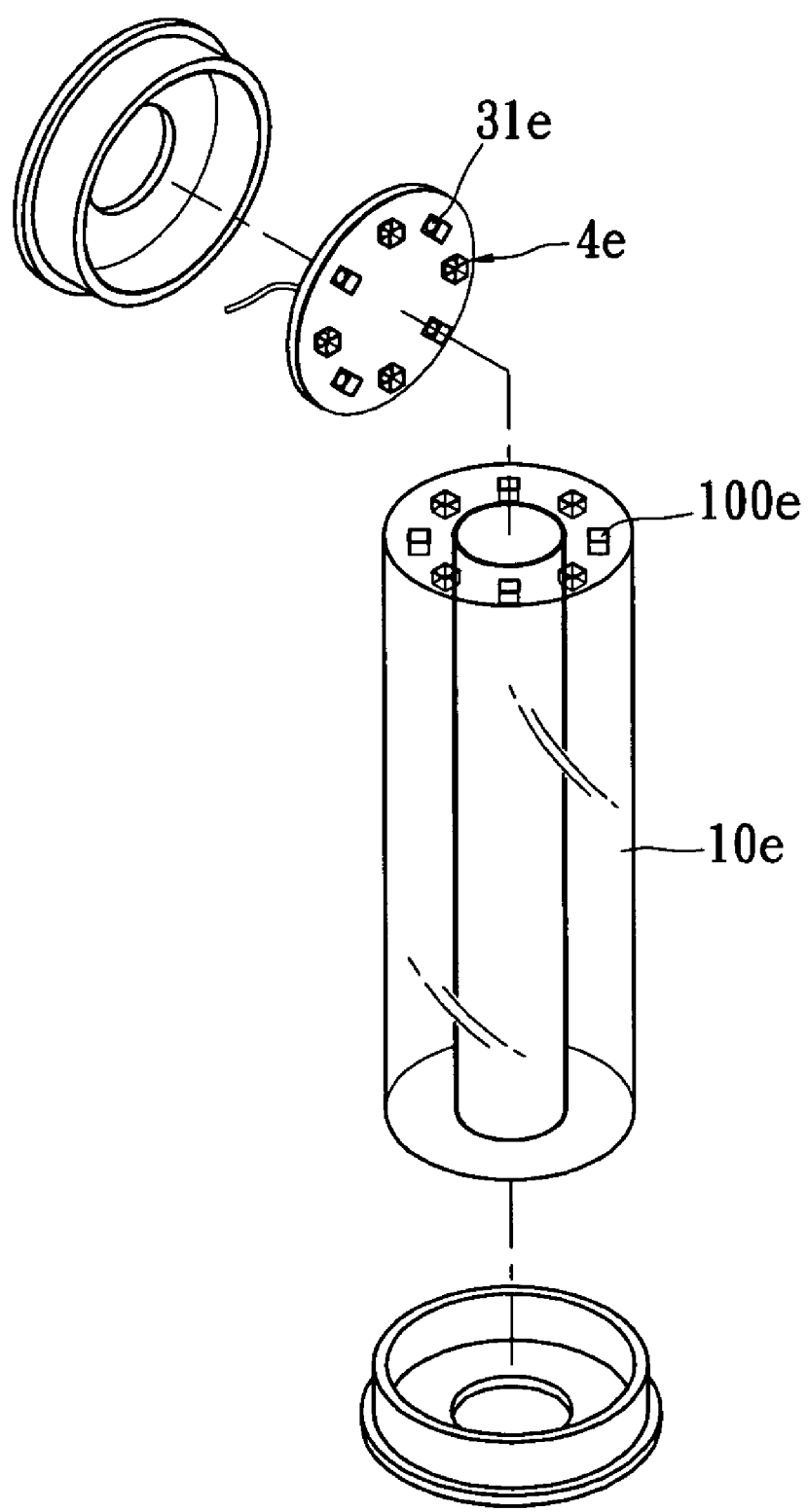
FIG. 5 is a perspective, exploded view of a light-emitting structure for generating an annular illumination effect according to the fifth embodiment of the present invention.

Referring to FIG. 5, the difference between the fifth embodiment and the third embodiment is that: in the fifth embodiment, the hollow light-guiding body 10e has a plurality of grooves 100e formed on its one end side and corresponding to the first light-emitting elements 31e, and the first light-emitting elements 31e are respectively received in the grooves 100e. Because the grooves 100e are separated from each other, the transparent package colloids 4e are respectively received in the grooves 100e, and each transparent package colloid 4e is filled between each first light-emitting element 31e and each groove 100e.

Figure 6A:
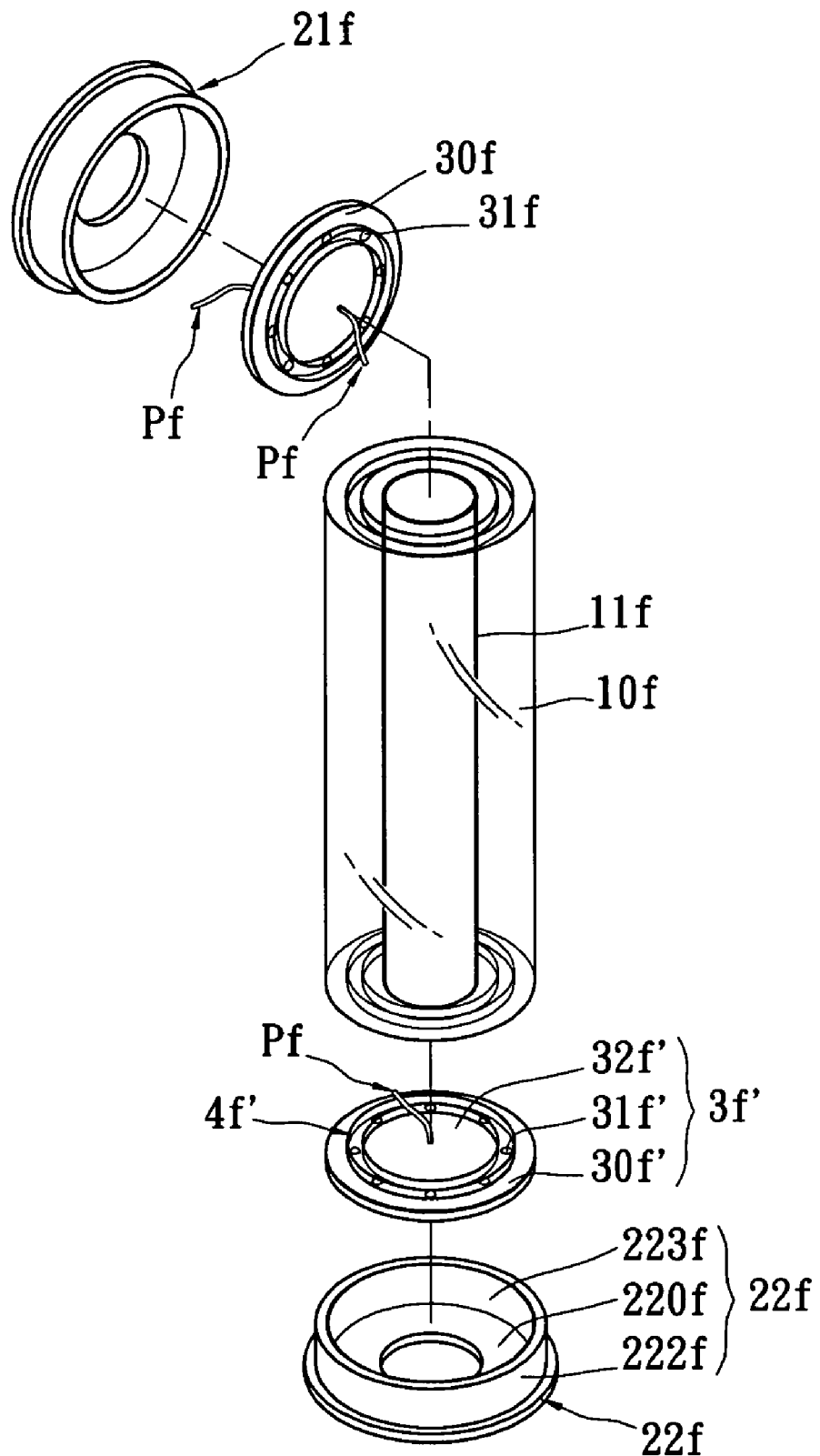
FIG. 6A is a perspective, exploded view of a light-emitting structure for generating an annular illumination effect according to the sixth embodiment of the present invention.
Figure 6B:
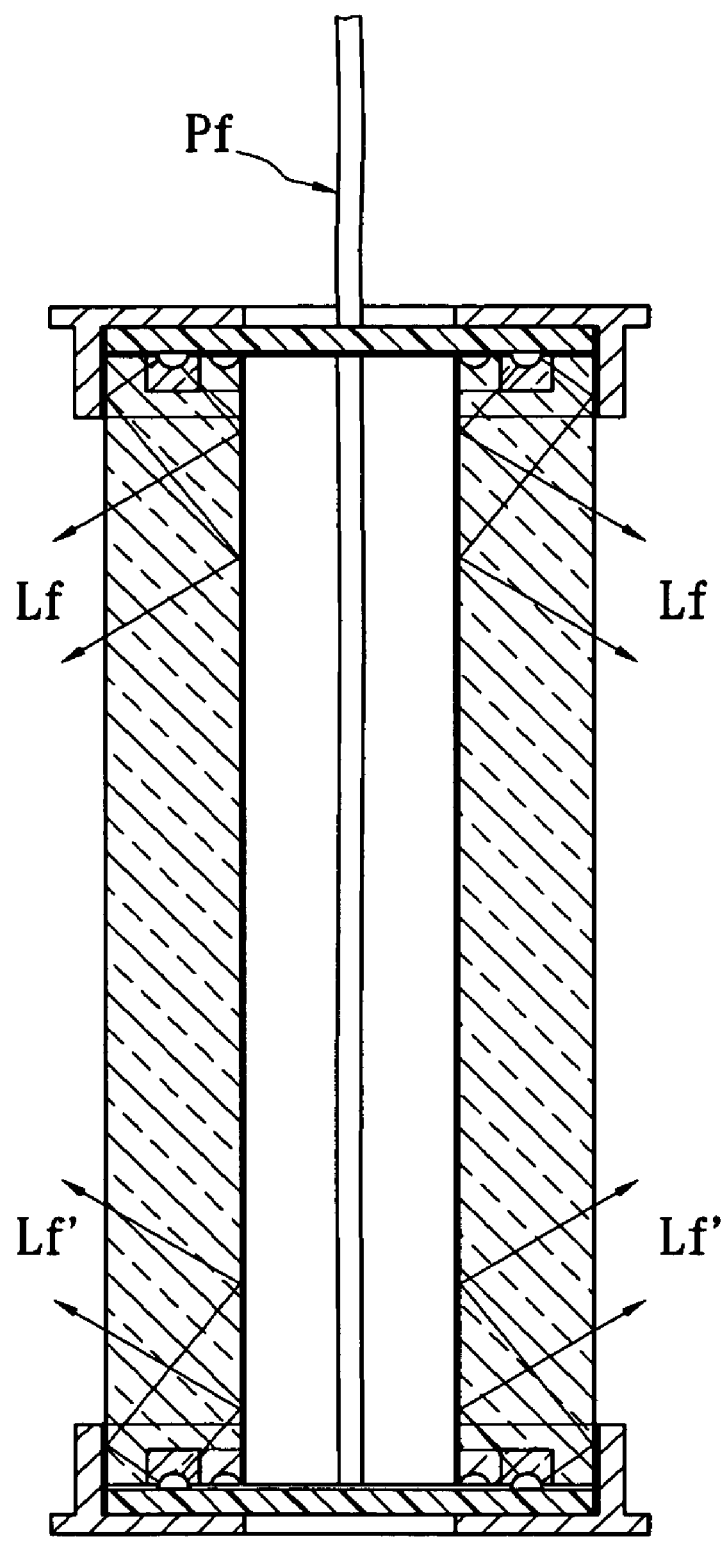
FIG. 6B is a lateral, cross-sectional view of a light-emitting structure for generating an annular illumination effect according to the sixth embodiment of the present invention.

Referring to FIGS. 6A and 6B, the difference between the sixth embodiment and the first embodiment is that: the sixth embodiment further includes a second light-emitting module 3f having a second substrate 30f, a plurality of second light-emitting element 31f, and a second reflecting layer 32f. The second substrate 30f can be PCB. The second light-emitting elements 31f are electrically disposed on the second substrate 30f. The second reflecting layer 32f is formed on the second substrate 30f and between the second light-emitting elements 31f.

Referring to FIG. 6B, the second light-emitting module 3f' is received in the second cover body 22f, so the second light-emitting elements 31f' are disposed over the second plane portion 220f and are enclosed by the second annular portion 222f, and the second light-emitting elements 31f' are disposed between the hollow light-guiding body 10f and the second cover body 22f. In addition, the light beams generated by the second light-emitting elements 31f' are effectively reflected onto the hollow light-guiding body 10f by matching the second reflected portion 223f and the second reflecting layer 32f'.

The transparent package colloid 4f' is filled between one end side of the hollow light-guiding body 10f and the second light-emitting elements 31f'. Hence, there is no air between one end side of the hollow light-guiding body 10f and the second light-emitting elements 31f'. Therefore, the transparent package colloid 4f' is helpful to the prevent invention to reduce optical loss from the second light-emitting elements 31f' to the hollow light-guiding body 10f.

Furthermore, the first substrate 30f and the second substrate 30f' are electrically connected with each other by an electric wire Pf, and the electric wire Pf passes through the hollow space of the hollow light-guiding body 10f and passes through the first cover body 21f to connect to a power source. Hence, the electric wire Pf is received in the hollow space of the hollow light-guiding body 10f and does not be exposed outside in order to enhance the aspect of the present invention.

Figure 7:
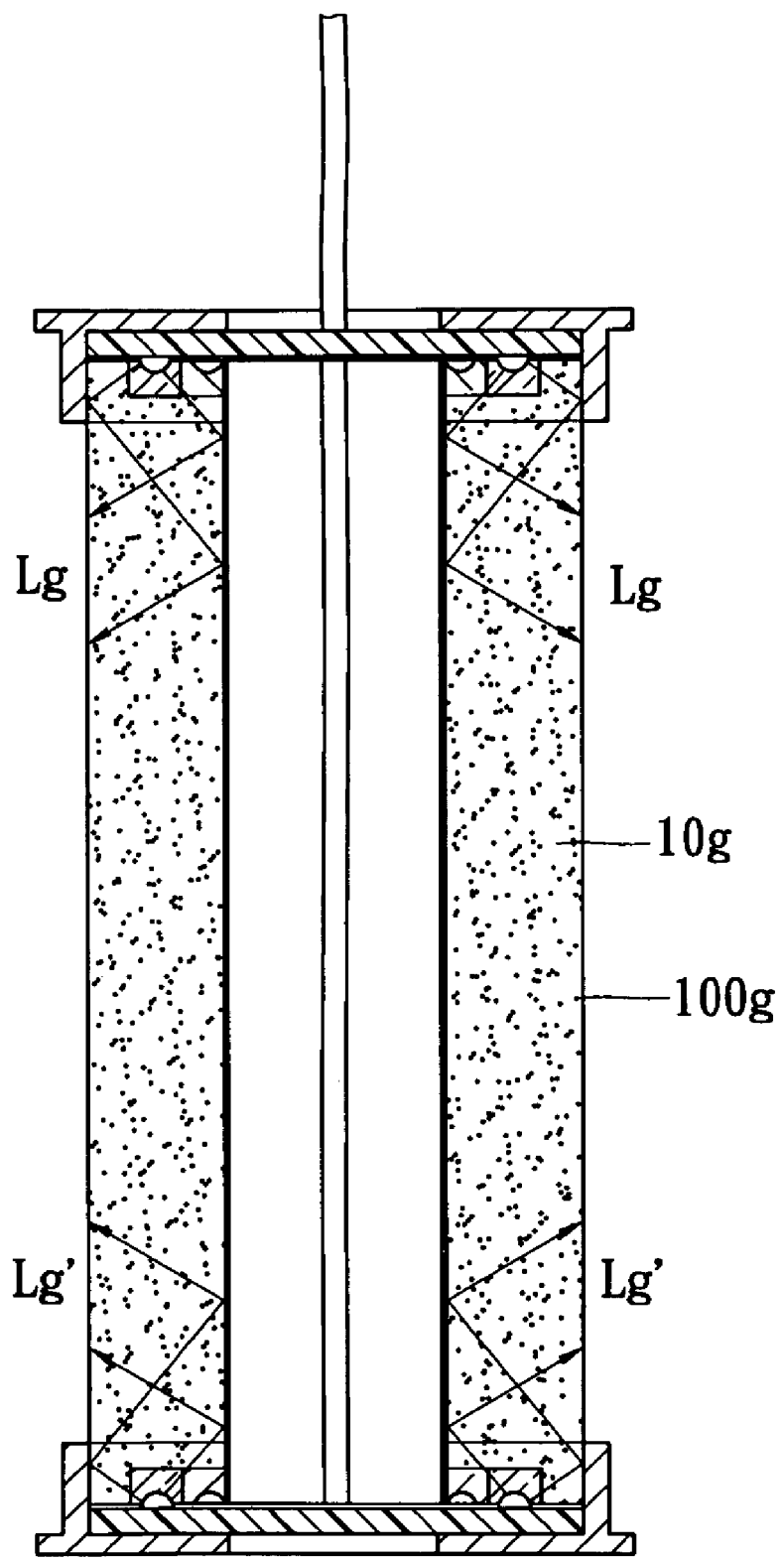
FIG. 7 is a lateral, partial cross-sectional view of a light-emitting structure for generating an annular illumination effect according to the seventh embodiment of the present invention.

Hence, first light beams Lf generated by the first light-emitting elements 31f are projected onto the hollow light-guiding body 10f (the hollow light-guiding body 10f is made of transparent materials), and the first light beams Lf are guided by the hollow light-guiding body 10f and are reflected by the reflecting layer 11f in order to make the hollow light-guiding body 10f generate the annular illumination effect; Second light beams Lf' generated by the second light-emitting elements 31f' are projected onto the hollow light-guiding body 10f (the hollow light-guiding body 10f is made of transparent materials), and the second light beams Lf' are guided by the hollow light-guiding body 10f and are reflected by the reflecting layer 11f in order to make the hollow light-guiding body 10f generate the annular illumination effect Referring to FIG. 7, the difference between the seventh embodiment and the sixth embodiment is that: in the seventh embodiment, the hollow light-guiding body 10g is formed by mixing transparent materials and diffusion powders (the diffusion powder occupies 0.5/1000~1/100 percentage of the hollow light-guiding body 10g) in order to make the hollow light-guiding body 10g shows haze effect, so the first light beams Lg and the second light beams Lg' are uniformly shown on the outer surface of the hollow light-guiding body 10g. For example, the diffusion powders are added to acrylics firstly, and then the diffusion powders and the acrylics are formed by injection molding. Hence, the acrylics shows haze effect to obtain uniform lights for providing light source. Therefore, the present invention not only can be a brightness device (as shown in the first embodiment to the sixth embodiment), but also can be a light source (as shown in the seventh embodiment).

Figure 8:
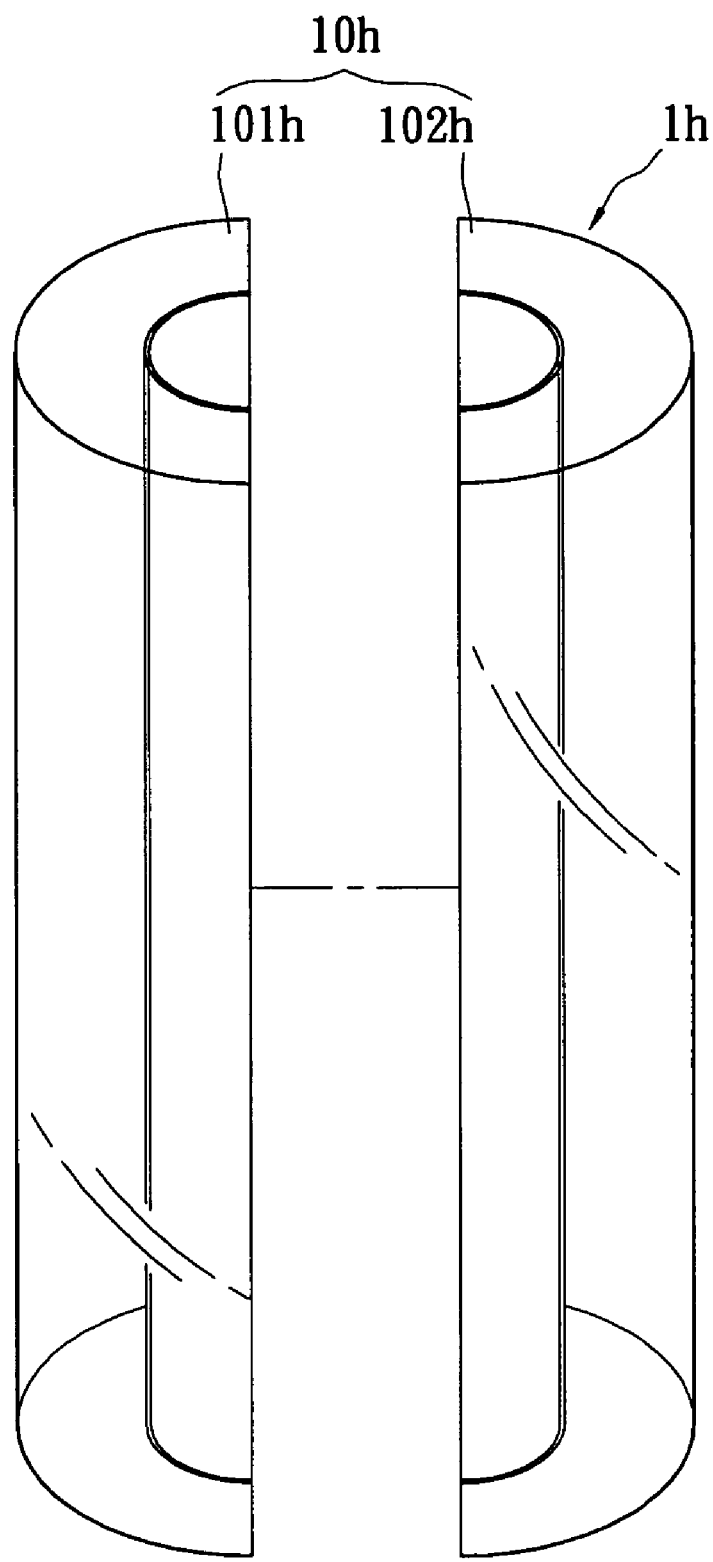
FIG. 8 is a perspective, exploded view of a light-emitting structure for generating an annular illumination effect according to the eighth embodiment of the present invention.

Referring to FIG. 8, the eighth embodiment provides a light-guiding module 1h having a hollow light-guiding body 10h. The hollow light-guiding body 10h is composed of two light-guiding blocks (101h, 102h).

Figure 9:
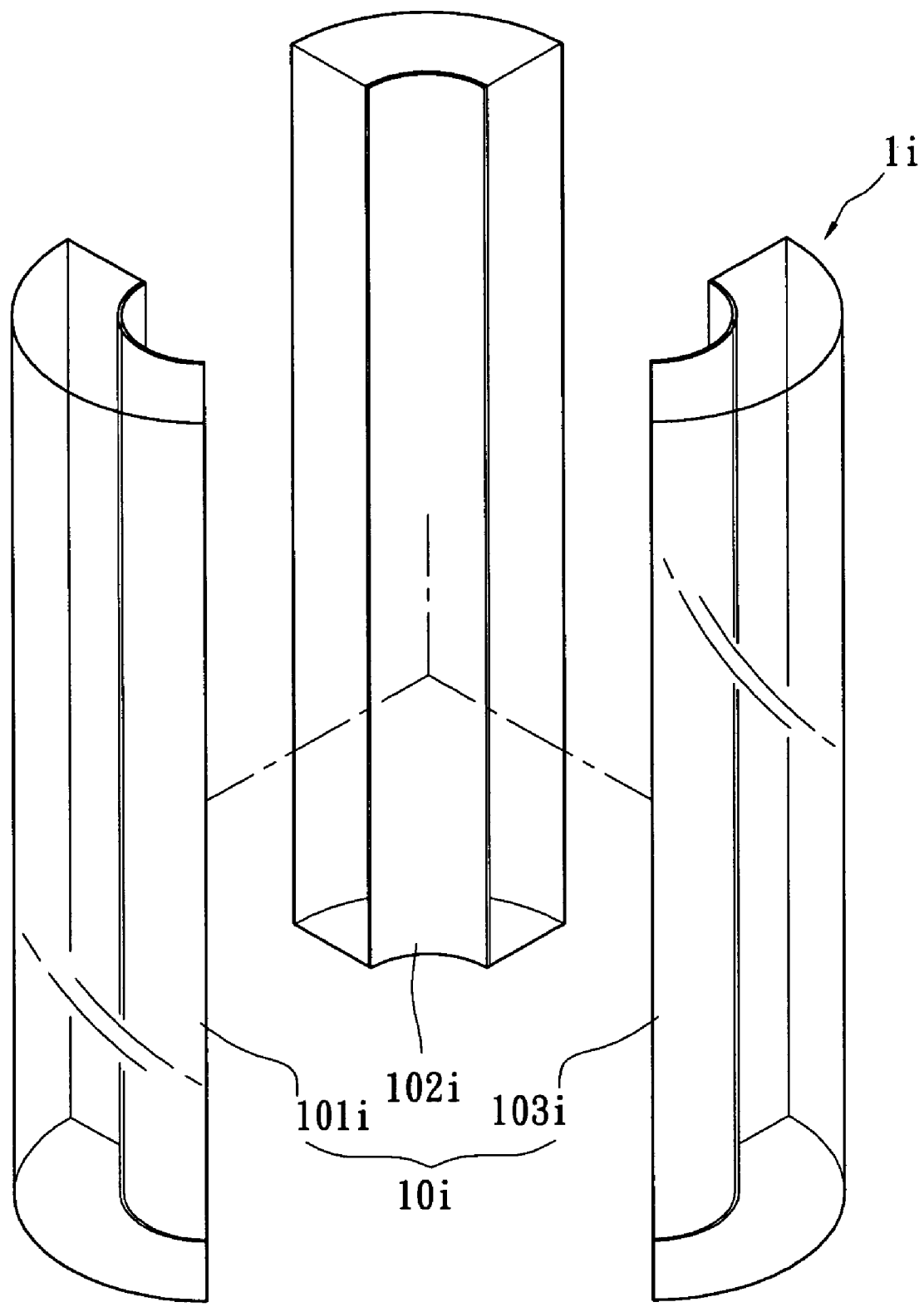
FIG. 9 is a perspective, exploded view of a light-emitting structure for generating an annular illumination effect according to the ninth embodiment of the present invention.

Referring to FIG. 9, the ninth embodiment provides a light-guiding module 1i having a hollow light-guiding body 10i. The hollow light-guiding body 10i is composed of three light-guiding blocks (101i, 102i, 103i).

The hollow light-guiding body can be composed of one or more light-guiding blocks as shown in FIGS. 8 and 9. Hence, the two light-guiding blocks (101h, 102h) of the eighth embodiment and the three light-guiding blocks (101i, 102i, 103i) of the ninth embodiment are just two examples. The hollow light-guiding body composed of one or more light-guiding blocks are protected in the present invention.

The light-emitting module has the following two embodiments:

1. The light-emitting module is composed of a plurality of light-emitting chip rows, and each light-emitting chip row has a plurality of first light-emitting chips with an emission wavelength range between 450 nm and 460 nm and at least one second light-emitting chip with an emission wavelength range between 620 nm and 640 nm.

One of the wavelength-converting layers is a mixture of orange phosphor powders and a package colloid, and light projected from one of the corresponding first light-emitting chip (such as the first light-emitting chip of a third position of the fourth light-emitting chip row) is absorbed and converted into projected light with an emission peak wavelength range between 595 nm and 610 nm via the mixture of orange phosphor powders and the package colloid. One part of the wavelength-converting layers is a mixture of green phosphor powders and a package colloid, and light projected from one part of the corresponding first light-emitting chip (such as the first light-emitting chip of a fourth position of the first light-emitting chip row and the first light-emitting chip of a three position of the second light-emitting chip row) is absorbed and converted into projected light with an emission peak wavelength range between 480 nm and 495 nm or between 520 nm and 540 nm via the mixture of green phosphor powders and the package colloid. Another part of the wavelength-converting layers is a mixture of yellow phosphor powders and a package colloid, and light projected from another part of the corresponding first light-emitting chip (such as the first light-emitting chip of a first position of the first light-emitting chip row and the first light-emitting chip of a first position of the second light-emitting chip row) is absorbed and converted into projected light with a predetermined color temperature between 2800 K and 7000 K or between 7000 K and 11000 K via the mixture of yellow phosphor powders and the package colloid. In addition, the yellow phosphor powders can be replaced by orange and green phosphor powders. Hence, light projected from another part of the corresponding first light-emitting chip is absorbed and converted into projected light with a predetermined color temperature via the mixture of orange and green phosphor powders and the package colloid. The second light-emitting chips are respectively and alternately arranged on different light-emitting chip rows.

2. The light-emitting module is composed of a blue light-emitting chip set that is covered by a wavelength-converting layer set, a red light-emitting chip set that is covered by a transparent layer set, a green light-emitting chip set that is covered by a transparent layer set, a yellow light-emitting chip set that is covered by a transparent layer set, and an amber light-emitting chip set that is covered by a transparent layer set. Hence, projected light emitted by the light-emitting chip sets are mixed each other to make the light-emitting module generate white light with a high color rendering index.

Furthermore, the present invention includes four types of wavelength-converting layer set, as follows:

1. First type: The wavelength-converting layer set is a mixture of yellow phosphor powders and a package colloid, and light projected from the blue light-emitting chip set is absorbed and converted into projected light with a color temperature range between 2800 K and 10000 K via the wavelength-converting layer set.

2. Second type: The wavelength-converting layer set is a mixture of orange and green phosphor powders and a package colloid, and light projected from the blue light-emitting chip set is absorbed and converted into projected light with a color temperature range between 2800 K and 10000 K via the wavelength-converting layer set.

3. Third type: The wavelength-converting layer set is composed of a plurality of first and second wavelength-converting layers, the first wavelength-converting layers are mixtures of yellow phosphor powders and a package colloid, and light projected from the blue light-emitting chip set is absorbed and converted into projected light with a color temperature range between 2800 K and 10000 K via the first wavelength-converting layers. The second wavelength-converting layers are mixtures of green phosphor powders and a package colloid, and light projected from the blue light-emitting chip set is absorbed and converted into projected light with an emission peak wavelength range between 480 nm and 495 nm via the second wavelength-converting layers.

4. Fourth type: The wavelength-converting layer set is composed of a plurality of first and second wavelength-converting layers, the first wavelength-converting layers are mixtures of orange and green phosphor powders and a package colloid, and light projected from the blue light-emitting chip set is absorbed and converted into projected light with a color temperature range between 2800 K and 10000 K via the first wavelength-converting layers. The second wavelength-converting layers are mixtures of green phosphor powders and a package colloid, and light projected from the blue light-emitting chip set is absorbed and converted into projected light with an emission peak wavelength range between 480 nm and 495 nm via the second wavelength-converting layers.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A light-emitting structure for generating an annular illumination effect, comprising:
    a light-guiding module having a hollow light-guiding body and a reflecting layer formed on an inner surface of the hollow light-guiding body;
    a cover module having a first cover body disposed on one end side of the hollow light-guiding body and a second cover body disposed on the other opposite end side of the hollow light-guiding body, the first cover body and the second cover body being made of an opaque material; and
    a first light-emitting module having a plurality of first light-emitting elements disposed between the hollow light-guiding body and the first cover body;
    whereby, first light beams generated by the first light-emitting elements are projected onto the hollow light-guiding body, and the first light beams are guided by the hollow light-guiding body and are reflected by the reflecting layer in order to make the hollow light-guiding body generate the annular illumination effect.

2. The light-emitting structure as claimed in claim 1, wherein the hollow light-guiding body is formed of one of a transparent material or a combination of a transparent material and a diffusion material, and the hollow light-guiding body is composed of one or more light-guiding blocks.

3. The light-emitting structure as claimed in claim 1, wherein the hollow light-guiding body has an annular groove formed on its one end side, and the first light-emitting elements are received in the annular groove.

4. The light-emitting structure as claimed in claim 3, further comprising: a transparent package colloid received in the annular groove and filled between the first light-emitting elements and the annular groove.

5. The light-emitting structure as claimed in claim 1, wherein the hollow light-guiding body has a plurality of grooves formed on its one end side, and the first light-emitting elements are respectively received in the grooves.

6. The light-emitting structure as claimed in claim 5, further comprising: a plurality of transparent package colloids respectively received in the grooves, wherein each transparent package colloid is filled between each first light-emitting element and each groove.

7. The light-emitting structure as claimed in claim 1, further comprising: a transparent package colloid between one end side of the hollow light-guiding body and the first light-emitting elements.

8. The light-emitting structure as claimed in claim 1, wherein the first cover body has a first plane portion, a first opening passing through the first plane portion, a first annular portion disposed on the first plane portion and a first reflected portion formed on an inner surface of the first annular portion, the first light-emitting elements are disposed over the first plane portion and are enclosed by the first annular portion, and one end side of the hollow light-guiding body is enclosed by the first annular portion in order to fix the first cover body on one end side of the hollow light-guiding body.

9. The light-emitting structure as claimed in claim 1, wherein the second cover body has a second plane portion, a second opening passing through the second plane portion and a second annular portion disposed on the second plane portion, and the other opposite end side of the hollow light-guiding body is enclosed by the second annular portion in order to fix the second cover body on the other opposite end side of the hollow light-guiding body.

10. The light-emitting structure as claimed in claim 1, wherein the second cover body has a second plane portion, a second opening passing through the second plane portion and a second annular portion disposed on the second plane portion, and the second annular portion is retained in the other opposite end side of the hollow light-guiding body in order to fix the second cover body on the other opposite end side of the hollow light-guiding body.

11. A light-emitting structure for generating an annular illumination effect, comprising:
    a light-guiding module having a hollow light-guiding body and a reflecting layer formed on an inner surface of the hollow light-guiding body:
    a cover module having a first opaque cover body disposed on one end side of the hollow light-guiding body and a second opaque cover body disposed on the other opposite end side of the hollow light-guiding body; and
    a first light-emitting module having a plurality of first light-emitting elements disposed between the hollow light-guiding body and the first cover body, the first light-emitting module having a first substrate and a first reflecting layer formed on the first substrate and between the first light-emitting elements, and the first light-emitting elements being electrically disposed on the first substrate;
    whereby, first light beams generated by the first light-emitting elements are projected onto the hollow light-guiding body, and the first light beams are guided by the hollow light-guiding body and are reflected by the reflecting layer in order to make the hollow light-guiding body generate the annular illumination effect.

12. A light-emitting structure for generating an annular illumination effect, comprising:

a light-guiding module having a hollow light-guiding body and a reflecting layer formed on an inner surface of the hollow light-guiding body;

a cover module having a first opaque cover body disposed on one end side of the hollow light-guiding body and a second opaque cover body disposed on the other opposite end side of the hollow light-guiding body;

a first light-emitting module having a plurality of first light-emitting elements disposed between the hollow light-guiding body and the first cover body; and a second light-emitting module having a plurality of second light-emitting element disposed between the hollow light-guiding body and the second cover body;

whereby, first light beams generated by the first light-emitting elements are projected onto the hollow light-guiding body, and the first light beams are guided by the hollow light-guiding body and are reflected by the reflecting layer in order to make the hollow light-guiding body generate the annular illumination effect.

13. The light-emitting structure as claimed in claim 12, wherein the second light-emitting module has a second substrate and a second reflecting layer formed on the second substrate and between the second light-emitting elements, and the second light-emitting elements are electrically disposed on the second substrate.

14. The light-emitting structure as claimed in claim 12, wherein the hollow light-guiding body has an annular groove formed on it's the other opposite end side, and the second light-emitting elements are received in the annular groove.

15. The light-emitting structure as claimed in claim 14, further comprising: a transparent package colloid received in the annular groove and filled between the second light-emitting elements and the annular groove.

16. The light-emitting structure as claimed in claim 12, wherein the hollow light-guiding body has a plurality of grooves formed on it's the other opposite end side, and the second light-emitting elements are respectively received in the grooves.

17. The light-emitting structure as claimed in claim 16, further comprising: a plurality of transparent package colloids respectively received in the grooves, wherein each transparent package colloid is filled between each second light-emitting element and each groove.

18. The light-emitting structure as claimed in claim 12, further comprising: a transparent package colloid between the other opposite end side of the hollow light-guiding body and the second light-emitting elements.

19. The light-emitting structure as claimed in claim 12, wherein the second cover body has a second plane portion, a second opening passing through the second plane portion, a second annular portion disposed on the second plane portion and a second reflected portion formed on an inner surface of the second annular portion, the second light-emitting elements are disposed over the second plane portion and are enclosed by the second annular portion, and the other opposite end side of the hollow light-guiding body is enclosed by the second annular portion in order to fix the second cover body on the other opposite end side of the hollow light-guiding body.

* * * * *